(12) United States Patent
Hashimoto et al.

(10) Patent No.: US 10,673,721 B2
(45) Date of Patent: Jun. 2, 2020

(54) ANOMALY DETECTION APPARATUS, ANOMALY DETECTION SYSTEM, AND ANOMALY DETECTION METHOD USING CORRELATION COEFFICIENTS

(71) Applicant: Hitachi, Ltd., Tokyo (JP)

(72) Inventors: Kyosuke Hashimoto, Tokyo (JP); Hitoshi Yabusaki, Tokyo (JP); Junji Kinoshita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 15/758,739

(22) PCT Filed: Mar. 24, 2016

(86) PCT No.: PCT/JP2016/059330
§ 371 (c)(1),
(2) Date: Mar. 9, 2018

(87) PCT Pub. No.: WO2017/163352
PCT Pub. Date: Sep. 28, 2017

(65) Prior Publication Data
US 2018/0270132 A1 Sep. 20, 2018

(51) Int. Cl.
*G06F 13/00* (2006.01)
*H04L 12/26* (2006.01)
*H04L 12/24* (2006.01)

(52) U.S. Cl.
CPC ........ *H04L 43/0823* (2013.01); *H04L 41/064* (2013.01); *H04L 43/16* (2013.01); *H04L 41/0213* (2013.01); *H04L 41/0893* (2013.01)

(58) Field of Classification Search
CPC ..... G06F 13/00; G06F 21/55; H04L 12/2602; H04L 29/06; H04L 29/08072; H04L 29/08144; H04L 29/08171; H04L 12/5695; H04L 41/12; H04L 41/22; H04L 41/0213; H04L 43/00; H04L 63/20; H04L 63/1425; H04L 63/1441; H04L 63/1483; H04L 2463/141; H04L 41/064; H04L 41/0893; H04L 43/16; H04L 43/0823
USPC ........................................ 709/223, 224, 226
See application file for complete search history.

(56) References Cited

U.S. PATENT DOCUMENTS

2009/0216624 A1 8/2009 Kato
2011/0213869 A1* 9/2011 Korsunsky .............. G06F 21/55
709/223

OTHER PUBLICATIONS

International Search Report of PCT/JP2016/059330 dated Mar. 24, 2016.

* cited by examiner

*Primary Examiner* — Robert B Harrell
(74) *Attorney, Agent, or Firm* — Mattingly & Malur, PC

(57) ABSTRACT

An anomaly detection apparatus for detecting data flow anomalies classes a plurality of data flows on the basis of similarity in time series changes in the data amounts of the data flows; calculates a correlation coefficient at a normal time and a correlation coefficient at a certain timing between at least two data flows belonging to the same class; and determines that at least one of the at least two data flows is anomalous when a difference between the correlation coefficient at the normal time and the correlation coefficient at the certain timing is greater than a predetermined threshold.

10 Claims, 13 Drawing Sheets

Flow information table 121

| Flow ID (200) | Destination IP address (201) | Source IP address (202) | Destination MAC address (203) | Source MAC address (204) | Destination port number (205) | Source port number (206) | Transport layer (207) | Network layer (208) | Virtual network ID (209) |
|---|---|---|---|---|---|---|---|---|---|
| 1 | | | | | | | | | |
| 1 | | | | | | | | | |
| 2 | | | | | | | | | |
| 3 | | | | | | | | | |
| .. | | | | | | | | | |

Fig. 4

Flow characteristics table 122

| Flow ID | Measurement time /310 | Communication amount average /320 | Communication amount standard deviation /330 | Flow group ID /340 | Flow discretization width /350 | Frequency component /360 |
|---|---|---|---|---|---|---|
| 1 | | | | A | | |
| 2 | | | | B | | |
| 3 | | | | A | | |
| .. | | | | .. | | |

Fig. 5

Flow group information table 123

| Flow group ID 400 | Flow group discretization width 410 | Window size 420 |
|---|---|---|
| A | | |
| B | | |

Correlation information table 124

| Flow ID (500) | Paired flow ID (501) | Correlation coefficient (502) | Correlation coefficient calculation frequency (503) | Correlation coefficient average (504) | Correlation coefficient standard deviation (505) | Correlation coefficient change time point (506) |
|---|---|---|---|---|---|---|
| 1 | 2 | | | | | |
| .. | 3 | | | | | |
| .. | .. | | | | | |
| .. | N | | | | | |
| 2 | 3 | | | | | |
| .. | 4 | | | | | |
| .. | .. | | | | | |
| .. | N | | | | | |
| .. | .. | | | | | |
| N-1 | N | | | | | |

Anomaly information table 125

| Flow ID (600) | Paired flow ID (601) | Anomaly content (602) | Anomaly duration (603) | Anomaly improvement method (604) |
|---|---|---|---|---|
|  |  |  |  |  |
|  |  |  |  |  |

Fig. 8

Communication amount table 126

| Flow ID | Time point | Communication amount [bps] |
|---|---|---|
| 1 | 201650311-140001 | 10 |
| 1 | 201650311-140002 | 11 |
| 1 | 201650311-140003 | 12 |
| 1 | 201650311-140004 | 11 |
| 2 | 201650311-140001 | 10 |

Fig. 9

ANOMALY DETECTION APPARATUS, ANOMALY DETECTION SYSTEM, AND ANOMALY DETECTION METHOD USING CORRELATION COEFFICIENTS

TECHNICAL FIELD

The present invention relates to the detection of an anomaly in data.

BACKGROUND ART

In recent years, with advancements made in cloud computing systems (hereinafter, referred to as "cloud systems") and virtual computers, there is a need to detect so-called silent failures such as failures caused by performance degradation of an application and failures due to a bug in a source code included in a version update of an application.

PTL 1 discloses an operations management apparatus including: a correlation model generation unit configured to derive, when a performance item or a controlled unit is designated as an element, a correlation function between at least a first series of performance information that indicates a time series variation about performance information of a first element and a second series of performance information that indicates time series variation about performance information of a second element, generate a correlation model on the basis of the correlation function, and obtain the correlation model for each element pair; and a model searching unit configured to search respective correlation models between the elements in series and determine an optimal correlation model, and predict performance information of the second element from performance information of the first element on the basis of the determined correlation model.

CITATION LIST

Patent Literature

[PTL 1]
U.S. Patent Application Publication No. 2009/0216624 (Specification)

SUMMARY OF INVENTION

Technical Problem

However, in the case of PTL 1, when a communication amount of a data flow increases as with a cloud, an amount of necessary calculations and an amount of necessary computation resources also increase and a longer calculation time is required. Therefore, an amount of calculations for a correlation coefficient with respect to a pair of data flows further increases. In consideration thereof, an object of the present invention is to reduce a processing load due to correlation analysis when detecting data anomalies.

Solution to Problem

An anomaly detection apparatus for detecting data flow anomalies according to an embodiment includes a processor and a memory. The processor is configured to:
class a plurality of data flows on the basis of similarity in time series changes in data amounts of the data flows;
calculate a correlation coefficient at a normal time and a correlation coefficient at a certain timing between at least two data flows belonging to a same class; and
determine that at least one of the at least two data flows is anomalous when a difference between the correlation coefficient at the normal time and the correlation coefficient at the certain timing is greater than a prescribed threshold.

Advantageous Effects of Invention

According to the present invention, a processing load due to correlation analysis when detecting an anomaly in data can be reduced.

BRIEF DESCRIPTION OF DRAWINGS

FIG. 4 is a diagram showing a configuration example of a flow information table.
FIG. 5 is a diagram showing a configuration example of a flow characteristics table.
FIG. 6 is a diagram showing a configuration example of a flow group information table.
FIG. 7 is a diagram showing a configuration example of a correlation information table.
FIG. 8 is a diagram showing a configuration example of an anomaly information table.
FIG. 9 is a diagram showing a configuration example of a communication amount table.

DESCRIPTION OF EMBODIMENTS

Figure 1:
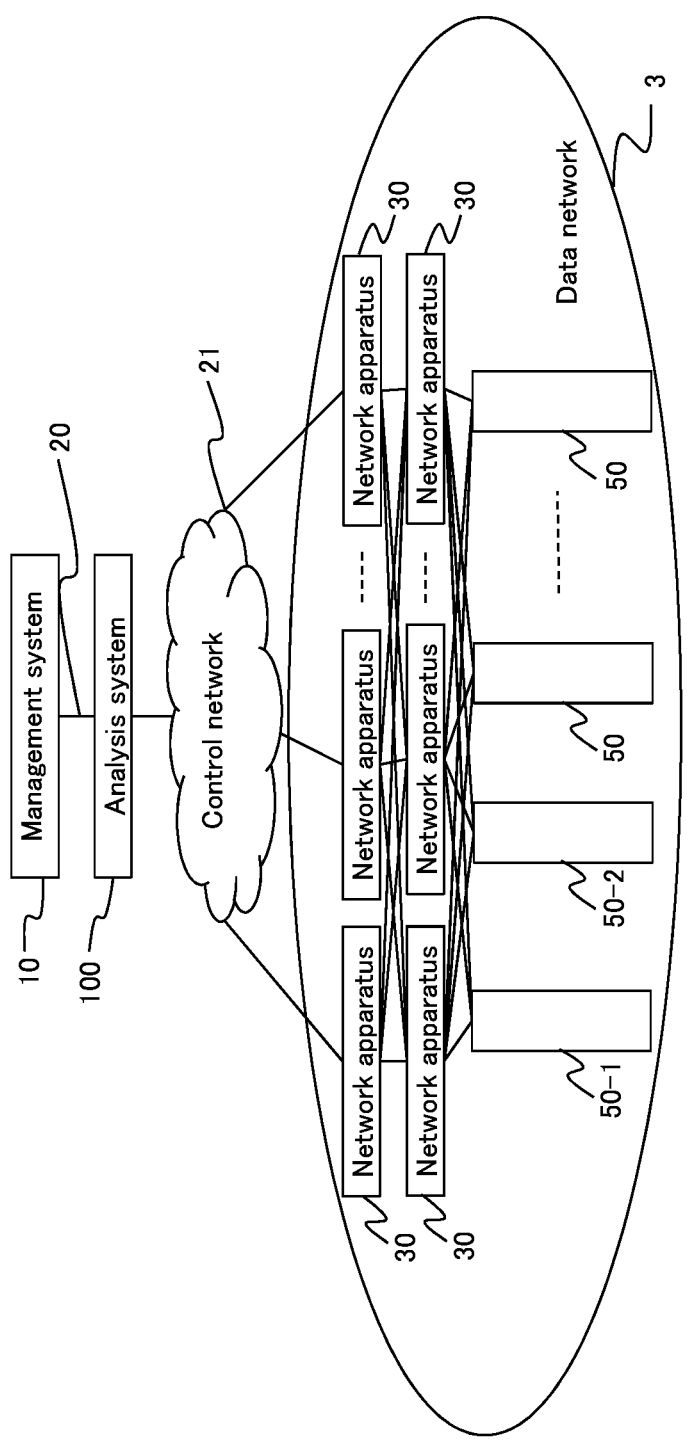
FIG. 1 is a diagram showing a configuration example of a data center according to the present embodiment.

Hereinafter, an embodiment will be described with reference to the drawings. It is to be understood that, when referring to the number and the like (including the number of pieces, a numerical value, and a range) of an element, with the exception of cases where it is clearly specified that the element is limited to a specific number and cases where it is principally obvious that the element is limited to the specific number, the element is not limited to the specific number and the number of the element may be the specific number or more, or the specific number or less. In addition, while the expressions "identification information", "identifier", "name", and "ID" may be used when describing contents of the respective pieces of information, these expressions are interchangeable. Furthermore, a component (including an element step and the like) is not necessarily essential expect when it is clearly specified that the component is essential and when it is principally obvious that the component is essential. In addition, although information may be described using expressions such as an "xxx table" or an "xxx list", information may be expressed using any kind of data structure. In other words, an "xxx table" or an "xxx list" can also be referred to as "xxx information" in order to demonstrate that information is not dependent on data structure. Furthermore, while a "program" is sometimes used as a subject when describing processing, since a program causes prescribed processing to be performed while using at least one of a storage resource (for example, a memory) and a communication interface device as appropriate by being executed by a processor (for example, a CPU (Central Processing Unit)), a processor or an apparatus including the processor may be used as a subject of processing. Processing performed by a processor may be partially or entirely performed by a hardware circuit. A computer program may be installed from a program source. The program source may be a program distribution server or a storage medium (for example, a portable storage medium). Furthermore, in the following description, when describing elements of a same type while distinguishing the elements from one another, reference signs such as a "computer 50-1" and a "computer 50-2" will be used, but when describing elements of a same type without distinguishing the elements from one another, only a shared number among the reference signs such as a "computer 50" may be used.

A system according to the present embodiment analyzes a correlation of time series changes in communication amounts of data flows (hereinafter, sometimes simply referred to as "flows") and, when a correlation coefficient indicated by a result of the analysis is lower by a prescribed amount or more than a correlation coefficient at a normal time (an ordinary time), the flows are detected as anomalous flows having exhibited a different behavior than ordinary. The system can detect, for example, an application system having exhibited a different behavior than ordinary. When detecting an anomalous flow, the system executes: a first process in which flows with similar characteristics (period characteristics, frequency component characteristics, or the like) of time series changes in a flow communication amount are classed into a same flow group; and a second process in which a correlation analysis is performed between flows belonging to a same flow group. Accordingly, in a correlation analysis for detecting an anomalous flow, the number of combinations of flows can be reduced. In other words, an amount of calculation of correlation analysis can be reduced and a period of time required by processing of the correlation analysis can be shortened.

In addition, the system according to the present embodiment calculates, on the basis of a flow communication amount, an appropriate window size (a contrast time) of two data flows to be a target of correlation analysis. Since an amount of data communication flowing through a cloud system is enormous, measurements often involve sampling. When a data communication amount is calculated from a sampled number of packets, a flow with a relatively small data communication amount as compared to other flows is hardly sampled. In this case, a measurement time (a discretization width) of the data communication amount can conceivably be increased. However, increasing a flow discretization width makes it difficult to detect instantaneous anomalies. Therefore, in the present embodiment, a suitable discretization width (a suitable flow discretization width) for each flow is calculated on the basis of a data communication amount. For example, the flow discretization width is increased when the data communication amount is small but the flow discretization width is reduced when the data communication amount is large. Accordingly, both an instantaneous anomaly of a flow with a relatively large data communication amount and a prolonged anomaly of a flow with a relatively small data communication amount can be detected.

Furthermore, in the present embodiment, a discretization width (a flow group discretization width) common to flows belonging to a flow group is calculated on the basis of the flow discretization width of each flow. When the flow discretization widths of respective flows are diversified, a process of matching the discretization widths of at least two flows to be a target of correlation analysis must be performed. In other words, for each combination of flows to be a target of correlation analysis, a calculation process for matching flow discretization widths must be performed. In the present embodiment, a common flow group discretization width is configured with respect to each flow belonging to a flow group. Accordingly, a calculation process of matching flow discretization widths for each combination of flows can be omitted and processing time required for correlation analysis can be shortened.

In addition, in the present embodiment, a manager is notified of information related to a flow in which an anomaly has been detected. An example of information related to the flow is information such as a 5-tuple and/or a virtual network ID (such as a VLAN tag: the same applies hereinafter) of the flow. Accordingly, a manager is able to specify a function, a device, and the like having exhibited a different behavior than ordinary from the notified information on the flow.

Moreover, in the present embodiment, a flow may be data communication uniquely determined by a destination MAC address, a source MAC address, a destination IP address, a source IP address, an L4 port number, and a virtual network ID included in a packet header of data communication. Alternatively, a flow may be data communication uniquely determined by a destination IP address, a source IP address, an L4 port number, and a virtual network ID. Alternatively, a flow may be data communication uniquely determined by a destination IP address, a source IP address, and a virtual network ID.

FIG. 1 shows a configuration example of a data center according to the present embodiment. The data center includes a management system 10, an analysis system. 100, a control network 21, a plurality of network apparatuses 30, and a plurality of computers 50. The plurality of network apparatuses 30 and the plurality of computers 50 may constitute a data network 3 coupled by a communication network. The data network 3 may be coupled to the control network 21. The management system 10 and/or the network apparatus 30 may be virtually mounted.

The network apparatus 30 may be virtually mounted to the computer 50. Details of the network apparatus 30 and the analysis system 100 will be respectively described later with reference to FIGS. 2 and 3.

The management system 10 is a system used by the manager to manage the data network 3 constituting a customer system. The management system 10 is coupled to the analysis system 100 via a prescribed network 20. The management system 10 may present the manager with various types of information transmitted from the analysis system 100. For example, the management system 10 notifies the manager of information on an anomalous flow transmitted from the analysis system 10. On the basis of the notified information on an anomalous flow, the manager may analyze an anomaly having occurred in the customer system. In addition, the manager may register contents of an anomaly having occurred in the customer system upon detection of an anomalous flow to the analysis system 100 via a GUI of the management system 10. Furthermore, the manager may be capable of referring to, via the management system 10, a correspondence between a previously-occurred anomaly of the customer system and information on an anomalous flow notified at that time.

The data network 3 may be logically separated for each customer system. For example, one data network 3 may constitute one customer system. A customer system may be an application system for each customer which is constituted by at least one application. For example, one customer system may be configured for each company using a data center. An example of a protocol of the data network 3 is native IP communication.

The control network 21 is a network which couples the network apparatus 30 and the analysis system 100. Data of each data network 3 may be collected by the analysis system 100 via the control network 21.

The computer 50 includes computation resources such as a CPU, a memory, and a storage, and executes an application in a customer system. Examples of an application include programs of a WEB server, an application server, and a DB (Database) server. The application may be mounted in a VM (Virtual Machine).

Figure 2:
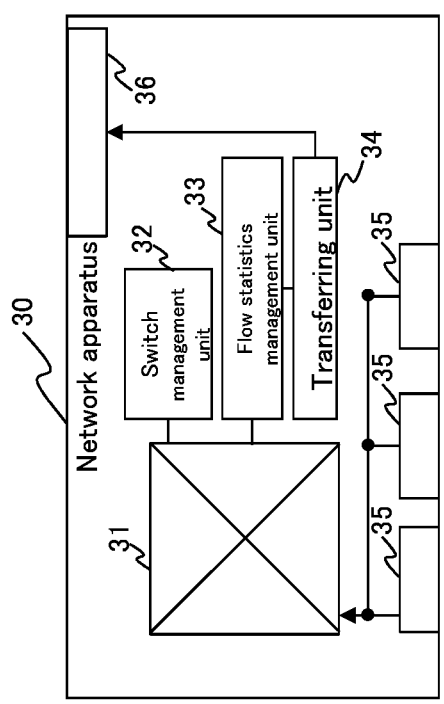
FIG. 2 is a diagram showing a configuration example of a network apparatus.

FIG. 2 shows a configuration example of the network apparatus 30. For example, the network apparatus 30 is a communication apparatus realized by a router, a switch, and the like. The network apparatus 30 may include, as functions, a switch 31, a switch management unit 32, a flow statistics management unit 33, a transferring unit 34, a port 35, and a management port 36.

The switch 31 may be an Ethernet (registered trademark) fabric switch which transfers a communication packet received from the port 35 to an output destination port matching header information in the communication packet.

The switch management unit 32 manages the switch 31. The switch management unit 32 may process, for example, a data reference request or a configuration request transmitted from a management terminal. Examples of protocol for communicating with the management terminal include SNMP (Simple Network Management Protocol) and sFlow.

The flow statistics management unit 33 counts a communication amount per flow of a communication packet or the number of communication packets received by the network apparatus 30. The flow statistics management unit 33 may support the sFlow protocol.

The transferring unit 34 transmits a value (a measured value) counted by the flow statistics management unit 33 to the analysis system 100.

The port 35 is a physical port for transmitting and receiving communication packets to and from the computer 50.

The management port 36 is a physical port for transmitting and receiving data to and from, for example, a management terminal. In addition, the management port 36 is a physical port for transmitting a measured value of the flow statistics management unit 33 to the analysis system 100.

Figure 3:
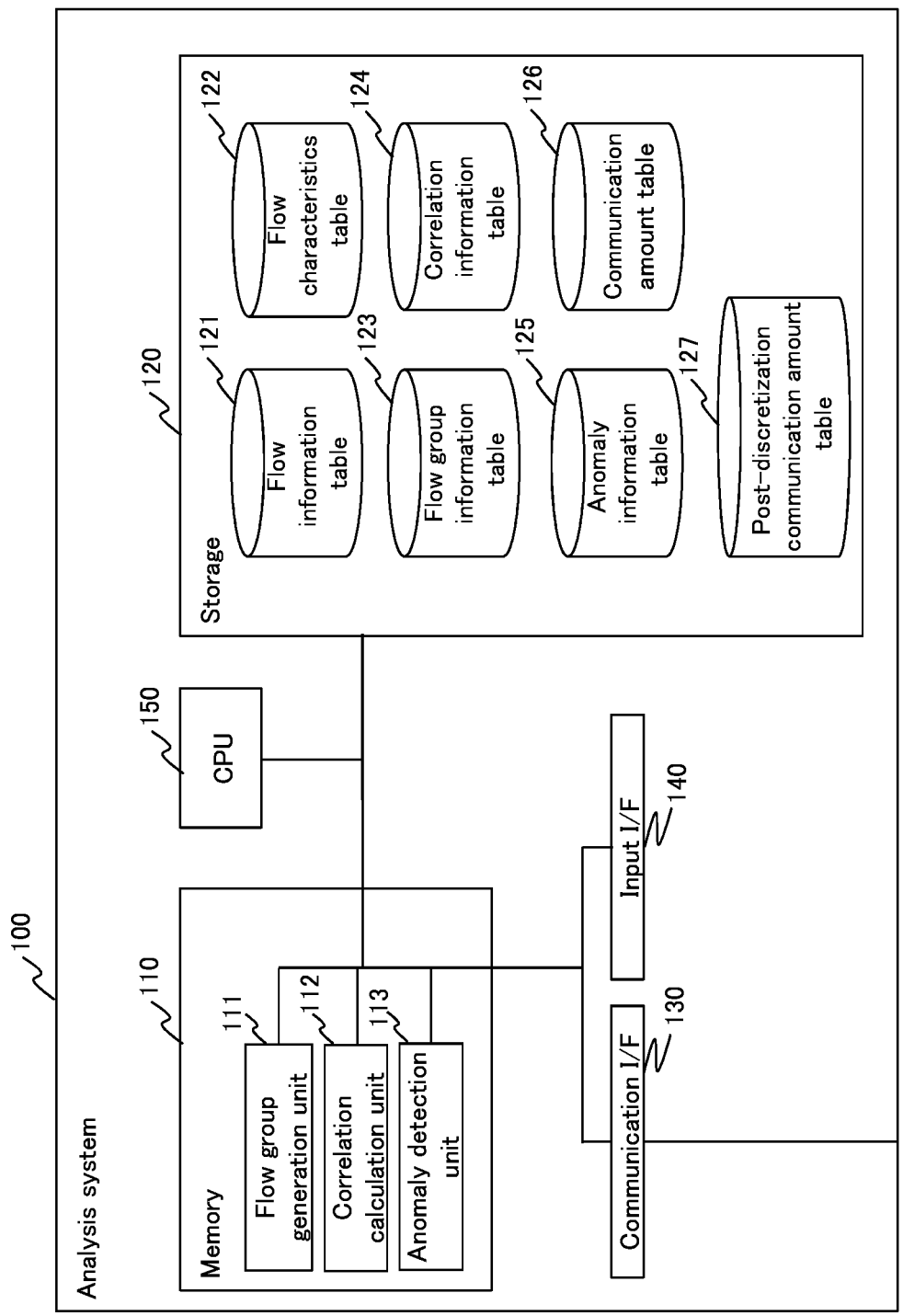
FIG. 3 is a diagram showing a configuration example of an analysis system.

FIG. 3 shows a configuration example of the analysis system 100. The analysis system 100 is a system for analyzing a data flow (a data communication amount) in the data network 3. The analysis system 100 may be constituted by a computer having a CPU 150, a communication I/F 130, an input I/F 140, a memory 110, a storage 120, and the like. Examples of the memory 110 include a DRAM (Dynamic Random Access Memory), a FeRAM (Ferroelectric Random Access Memory), and an MRAM (Magnetoresistive Random Access Memory). Examples of the storage 120 include an SSD (solid state drive) and an HDD (Hard Disk Drive).

The input I/F 140 is a (northbound) interface for notifying the manager of a detected anomalous flow and accepting an input of anomaly contents from the manager via an operation screen or the like of the management system 10 coupled to the analysis system 100.

The communication I/F 103 is a (southbound) interface for receiving a measurement result from the network apparatus 30.

The memory 110 may store, as functions, a flow group generation unit 111, a correlation calculation unit 112, and an anomaly detection unit 113. These functions may be realized as a program stored in the storage 120 is read to the memory 110 and executed by the CPU 150. The program may be stored in advance in the storage 120 or may be installed from the outside via a prescribed network or via a portable storage medium. Alternatively, these functions 111, 112, and 113 may be collectively referred to as a flow analysis unit.

The storage 120 may store, as data, a flow information table 121, a flow characteristics table 122, a flow group information table 123, a correlation information table 124, an anomaly information table 125, a communication amount table 126, and a post-discretization communication amount table 127.

Hereinafter, each table will be described. It should be noted that the following tables are merely examples and each table may be normalized as a plurality of tables or may be coupled to other tables.

FIG. 4 shows a configuration example of the flow information table 121. The flow information table 121 manages information related to flows (referred to as "flow information").

The flow information table 121 may include, as data items, a flow ID 200, a destination IP address 201, a source IP address 202, a destination MAC address 203, a source MAC address 204, a destination port number 205, a source port number 206, a transport layer 207, a network layer 208, and a virtual network ID 209.

The flow ID 200 is a value for uniquely identifying a flow which flows through the data network 3. The flow ID 200 may be assigned by the flow statistics management unit 33 of the network apparatus 30.

The destination IP address 201 indicates an IP address of a destination of a flow with the flow ID 200. The source IP address 202 indicates an IP address of a source of the flow with the flow ID 200.

The destination MAC address 203 indicates a MAC address of the destination of the flow with the flow ID 200. The source MAC address 204 indicates a MAC address of the source of the flow with the flow ID 200.

The destination port number 205 indicates a port number of the destination of the flow with the flow ID 200. The source port number 206 indicates a port number of the source of the flow with the flow ID 200.

The transport layer 207 indicates a type (TCP, UDP, or the like) of a transport layer of the flow with the flow ID 200.

The network layer 208 indicates a type (IPv4, IPv6, ICMP (Internet Control Message Protocol), and the like) of a network layer of the flow with the flow ID 200.

The virtual network ID 209 indicates an ID of a virtual network to which the flow with the flow ID 200 belongs.

These pieces of information are attained from header information of an IP packet constituting the flow. Moreover, one record in the flow information table 121 may be information attained from one IP packet. In other words, a plurality of entries having the same flow ID 200 may exist in the flow information table 121.

FIG. 5 shows a configuration example of the flow characteristics table 122. The flow characteristics table 122 manages information related to characteristics (referred to as "flow characteristics") of time series changes in a communication amount of a flow. The flow characteristics table 122 may include, as data items, a flow ID 300, a measurement time 310, a communication amount average 320, a communication amount standard deviation 330, a flow group ID 340, a flow discretization width 350, and a frequency component 360.

The flow ID 300 is the same as the flow ID 200 shown in FIG. 4.

The measurement time 310 indicates a measurement time of the flow communication amount of the flow ID 300.

The communication amount average 320 indicates an average per unit time of the flow communication amount of the flow ID 300. The communication amount average 320 may be calculated from a flow communication amount measured within the measurement time 310.

The communication amount standard deviation 330 indicates a standard deviation per unit time of the flow communication amount of the flow ID 300. The standard deviation 330 of the flow communication amount may be calculated from a flow communication amount measured within the measurement time 310.

The flow group ID 340 is a number for uniquely identifying a flow group. Flows of the flow ID 300 having the same flow group ID 340 belong to the same flow group. A flow group into which flow IDs 300 are classed may be determined on the basis of the measurement time 310, the communication amount average 320, and the communication amount standard deviation 330. Details of a class method will be provided later.

The flow discretization width 350 indicates a discretization width (time) of a flow with the flow ID 300. The flow discretization width 350 is used when calculating a correlation coefficient between flows. An initial value of the flow discretization width 350 may be configured by the manager. Details of a calculation method of the flow discretization width 350 will be provided later.

The frequency component 360 indicates a frequency component of time series changes in the flow communication amount of the flow ID 300. The frequency component 360 may store a frequency band including frequency components equal to or larger than a prescribed threshold. A calculation method of the frequency component 360 will be described later.

FIG. 6 shows a configuration example of the flow group information table 123. The flow group information table 123 manages information related to a flow group. The flow group information table 123 may include, as data items, a flow group ID 400, a flow group discretization width 410, and a window size 420.

The flow group ID 400 is the same as the flow group ID 340 shown in FIG. 5. The flow group discretization width 410 indicates a discretization width with respect to a flow group with the flow group ID 400. The window size 420 indicates a window size with respect to the flow group with the flow group ID 400.

A common flow group discretization width 410 and a common window size 420 are applied to flows of all flow IDs 300 belonging to the flow group ID 400. A window size (contrast time) as a target of calculation of a correlation coefficient may be calculated as a prescribed multiple of the flow group discretization width 410.

Therefore, when calculating a correlation coefficient between flow IDs belonging to the same flow group ID, the correlation calculation unit 112 of the analysis system 100 may use the window size 420 (contrast time) associated with the flow group ID in the flow group information table 123. In other words, according to the present embodiment, a discretization width no longer has to be matched every time a correlation coefficient is calculated.

FIG. 7 shows a configuration example of the correlation information table 124. The correlation information table 124 manages information related to a result of correlation analysis. The correlation information table 124 may include, as data items, a flow ID 500, a paired flow ID 501, a correlation coefficient 502, a correlation coefficient calculation frequency 503, a correlation coefficient average 504, a correlation coefficient standard deviation 505, and a correlation coefficient change time point 506.

The flow ID 500 and the paired flow ID 501 are the same as the flow ID 200 shown in FIG. 4.

The correlation coefficient 502 indicates a correlation coefficient between a flow with the flow ID 500 and a flow with the paired flow ID 501. The flow ID 500 and the paired flow ID 501 belong to a same flow group. Therefore, the correlation coefficient 502 is a value calculated using the window size 420 associated with the flow group ID 400 to which the flow ID 500 and the paired flow ID 501 belong in the flow group information table 123.

The correlation coefficient calculation frequency 503 indicates the number of times the correlation coefficient 502 has been calculated.

The correlation coefficient average 504 indicates an average of the correlation coefficients 502. Specifically, the correlation coefficient average 504 represents an average when a latest calculated correlation coefficient 502 is included in an original correlation coefficient average 504. In other words, the correlation coefficient average 504 may be updated every time the correlation coefficient 502 is calculated.

The correlation coefficient standard deviation 505 indicates a standard deviation of the correlation coefficient 502. Specifically, the correlation coefficient standard deviation 505 represents a standard deviation when a latest calculated correlation coefficient is included in an original correlation coefficient standard deviation 505. In other words, the correlation coefficient standard deviation 505 may be updated every time the correlation coefficient 502 is calculated.

The correlation coefficient change time point 506 represents a time point (timing) at which a significant change had occurred in the correlation coefficient 502. For example, when a difference between the correlation coefficient 502 and the correlation coefficient average 504 is greater than a prescribed threshold, the correlation coefficient change time point 506 is a time point at which the flow ID 500 or the paired flow ID 501 related to the correlation coefficient 502 had been detected. When no significant change is occurring in the correlation coefficient 502, the correlation coefficient change time point 506 may be left blank (NULL).

FIG. 8 is a diagram showing a configuration example of the anomaly information table 125. The anomaly information table 125 manages information related to a flow (an anomalous flow) detected as anomalous. The anomaly information table 125 may include, as data items, a flow ID 600, a paired flow ID 601, an anomaly content 602, an anomaly duration 603, and an anomaly improvement method 604.

The flow ID 600 and the paired flow ID 601 represent flow IDs detected as anomalous. The flow ID 600 and the paired flow ID 601 may be the flow ID 500 and the paired flow ID 501 of which a time point is stored in the correlation coefficient change time point 506 of the correlation information table 124.

The anomaly content 602 indicates a content of an anomaly which is associated with the flow ID 600 and the paired flow ID 601 and which has occurred in a customer system.

The anomaly duration 603 indicates a duration of the anomaly with the anomaly content 602 in the customer system.

The anomaly improvement method 604 indicates information regarding an improvement method with respect to the anomaly with the anomaly content 602 in the customer system.

The anomaly content 602 may store contents of an anomaly having occurred in the customer system at the correlation coefficient change time point 506 corresponding to the flow ID 600 and the paired flow ID 601 in the correlation information table 124.

The anomaly content 602, the anomaly duration 603 and/or the anomaly improvement method 604 may be input by the manager. For example, the analysis system 100 may present the correlation coefficient change time point 506 to the manager via the management system 10 and have the manager input contents of an anomaly having occurred in the customer system at the correlation coefficient change time point, a duration of the anomaly and/or an improvement method with respect to the anomaly.

FIG. 9 shows a configuration example of the communication amount table 126. The communication amount table 126 manages a data communication amount at each time point of each flow. The communication amount table 126 may include, as data items, a flow ID 700, a time point 701, and a communication amount 702.

The flow ID 700 is the same as the flow ID 200 shown in FIG. 4.

The time point 701 represents a time point at which the communication amount 702 of a flow with the flow ID 700 had been measured. The time point 701 may be a time point at which the analysis system 100 had received information on a communication amount from the network apparatus 30 or a time point at which the network apparatus 30 had measured the communication amount.

The communication amount 702 represents a communication amount at the time point 701 of the flow with the flow ID 700. The communication amount 702 may be a value actually measured by the network apparatus 30 or a value calculated from sampled data (packet).

Moreover, data items included in the post-discretization communication amount table 127 may be the same as the data items of the communication amount table 126 shown in FIG. 9. Therefore, a description of a screen of the post-discretization communication amount table 127 will be omitted.

Figure 10:
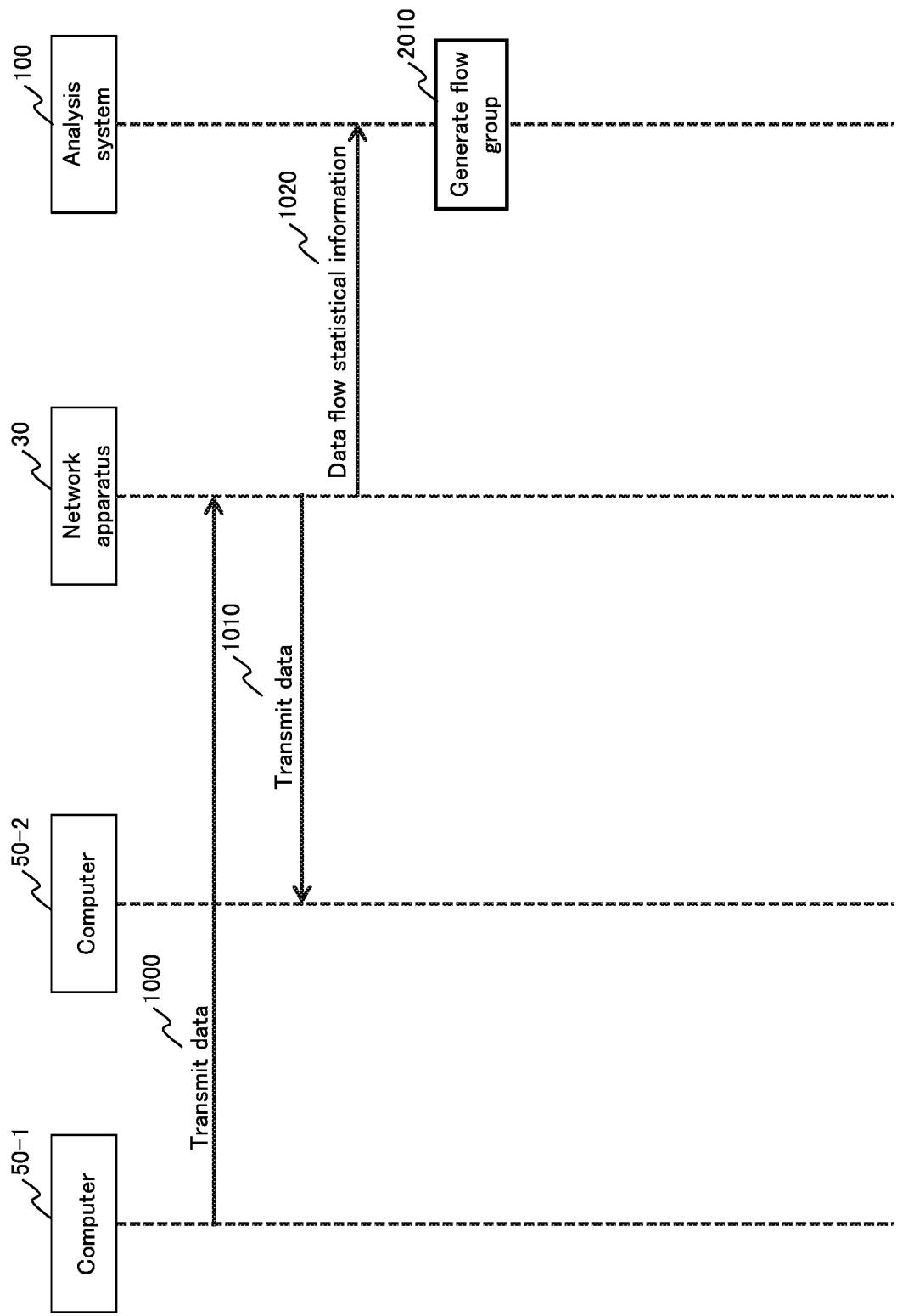
FIG. 10 is a sequence chart showing an example of a generation process of a flow group.

FIG. 10 is a sequence chart showing an example of a generation process of a flow group. The generation process of a flow group may be executed upon installation of the analysis system 100, regularly, upon new deployment or configuration of an application, upon an occurrence of a prescribed event, or the like. FIG. 10 represents an example of a process in which the network apparatus 30 measures a communication amount of data transmitted by the computer 50-1 to the computer 50-2 and the analysis system 100 generates a flow group on the basis of a result of the measurement.

(Step 1000) The computer 50-1 transmits data having the computer 50-2 as a destination to the network apparatus 30. The data may be an IP packet.

(Step 1010) The network apparatus 30 transfers the data transmitted from the computer 50-1 that is the source to the computer 50-2 that is the destination.

(Step 1020) The network apparatus 30 measures a flow communication amount of the transferred data and transmits information on the flow and a measurement result to the analysis system 100. The flow information may be information included in a header of the transferred data (IP packet) (in other words, a value corresponding to a data item of the flow information table 120). The measurement result of the flow may be statistical information (for example, the measurement time 310, the communication amount average 320, and the communication amount standard deviation 330) on the basis of sampling. The network apparatus 30 may execute the process of step 1020 for each data transfer, on a regular basis, or every time the number of data transfers reaches a prescribed number of times. Moreover, the flow ID may be assigned by the network apparatus 30 or by the analysis system 100. The network apparatus 30 may transmit the measurement result of the flow to the analysis system 100 in accordance with the sFlow protocol.

(Step 2010) The analysis system 100 executes a flow group generation process. The process will be described below.

Figure 11:
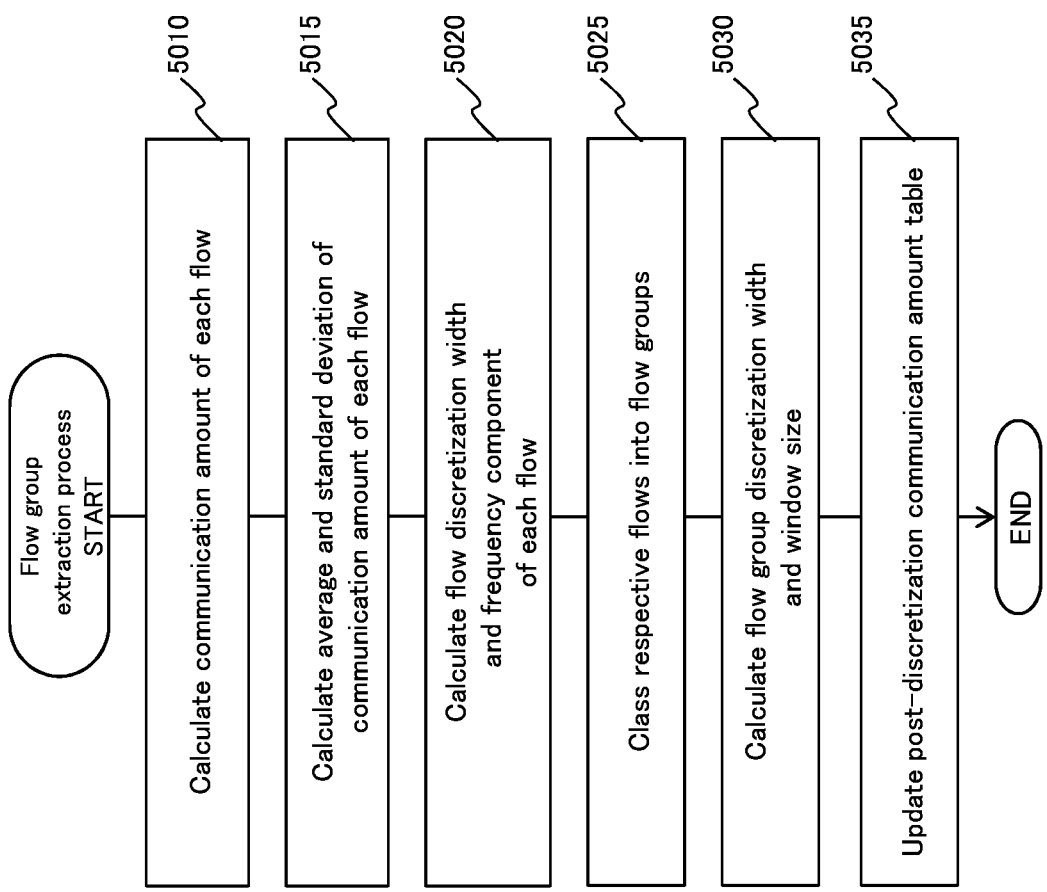
FIG. 11 is a flow chart showing an example of a flow group generation process.

FIG. 11 is a flow chart showing an example of the flow group generation process. The present process corresponds to the process of step 2010 in FIG. 10.

(Step 5010) The flow group generation unit 111 calculates a communication amount of each flow. The flow group generation unit 111 may execute the processes of (A1) to (A4) below with respect to each flow ID.

(A1) The flow group generation unit 111 counts entries with matching flow IDs 200 in the flow information table 121.

(A2) On the basis of the number of entries, the flow group generation unit 111 calculates the number of packets of flows with the flow ID. The number of packets may be calculated as "sampling rate in the network apparatus 30×number of entries". The sampling rate may be initially configured in the network apparatus 30 and the analysis system 100.

(A3) On the basis of the number of packets, an average packet length, and the measurement time, the flow group generation unit 111 calculates the communication amount of the flow ID. The communication amount may be calculated as "number of packets×average packet length/measurement time". The average packet length and the measurement time may be initially configured in the network apparatus 30 and the analysis system 100 or may be measured by the network apparatus 30.

(A4) The flow group generation unit 111 associates the flow ID, a time point at which the measurement result had been received in step 1020, and the calculated communication amount with each other and stores the associated values in the communication amount table 126. Moreover, the time point at which the measurement result had been received may be a time point at which the network apparatus 30 had received the data.

(Step 5015) The flow group generation unit 111 calculates the communication amount average 320 and the communication amount standard deviation 330 of each flow. The flow group generation unit 111 may execute the processes of (B1) to (B2) below with respect to each flow ID.

(B1) The flow group generation unit 111 extracts entries with the same flow ID 700 from the communication amount table 126. In addition, the flow group extraction unit 111 specifies an oldest time point and a newest time point from the time points 701 of the extracted entries.

(B2) The flow group generation unit 111 stores times from the oldest time point to the newest time point in the measurement time 310 corresponding to the flow ID specified in (B1) described above in the flow characteristics table 122. The flow group extraction unit 111 stores (overwrites) an average and a standard deviation calculated from the communication amount 702 extracted in (B1) described above in the communication amount average 320 and the communication amount standard deviation 330 corresponding to the flow ID specified in (B1) described above in the flow characteristics table 122.

(Step 5020) The flow group generation unit 111 calculates the flow discretization width 350 and the frequency component 360 of each flow. Hereinafter, calculation methods of the flow discretization width 350 and the frequency component 306 will be described.

(Calculation Method of Flow Discretization Width 350)

The reason for calculating a flow discretization width for each flow is as follows. When the communication amount of a flow is extremely small, the number of packets sampled with respect to the flow is also small. Therefore, when calculating a communication amount as described in (A3) above on the basis of the small number of sampled packets, a slight increase or decrease in the number of sampled packets causes the calculated communication amount to greatly fluctuate. In this case, it is impossible to determine whether the fluctuation in the detected communication amount is due to an actual increase or decrease in the communication amount (in other words, a significant fluctuation) or an incidental increase or decrease in the number of sampled packets (in other words, a non-significant fluctuation).

In consideration thereof, in the present embodiment, on the basis of a magnitude of the communication amount of each flow, an appropriate (with a statistical reliability of a prescribed degree or more) sampling time of each flow is calculated. This sampling time is referred to as a "flow discretization width". The flow discretization width 350 may be calculated as "analyzable communication amount/communication amount average". The analyzable communication amount may be a prescribed value. The communication amount average may be the communication amount average 320 associated with the flow ID in the flow characteristics table 122.

(Calculation Method of Frequency Component 360)

Whether or not a flow is anomalous may conceivably be determined as follows. Specifically, with respect to all combinations of measured flows, a correlation coefficient related to time series changes in a communication amount at a normal time (an ordinary time) is respectively calculated in advance. Subsequently, a correlation coefficient is calculated with respect to all combinations and, when a difference between the calculated correlation coefficient and the correlation coefficient at a normal time is greater than a prescribed difference, a flow related to the combination is determined as anomalous.

However, as the number of flows increases, the number of combinations of flows becomes enormous, making it difficult to calculate a correlation coefficient with respect to all of the combinations. In consideration thereof, in the present embodiment, flows with similar characteristics in the time series changes in the communication amount at a normal time (an ordinary time) are classed into a same flow group. Subsequently, a correlation coefficient is calculated with respect to combinations of flows belonging to the flow group, and an anomaly of a flow is determined by comparing the calculated correlation coefficient and the correlation coefficient at a normal time. Accordingly, since the number of combinations of flows becomes smaller, a processing load required for calculating correlation coefficients can be reduced. The frequency component is an index used when classing the respective flows into flow groups. Hereinafter, a method of classing the respective flows into flow groups will be described.

For example, characteristics of time series changes in a communication amount of a flow (flow characteristics) can be classed into: (C1) non-stationary and regular flow characteristics (hereinafter, referred to as "flow characteristics with high periodicity"); (C2) stationary flow characteristics; and (C3) non-stationary and irregular flow characteristics (hereinafter, referred to as "flow characteristics with low periodicity"). When flow characteristics are similar, a correlation is also likely to be high. Conversely, when flow characteristics are not similar, a correlation is also likely to be low. Since period characteristics can be expressed as frequency characteristics, "with high periodicity" can be expressed as "with a specific strong frequency component". Hereinafter, (C1) to (C3) will be described.

(C1) In a case of at least two flow characteristics with high periodicity, the more similar the frequency component (period) and a phase, the more likely that the correlation coefficient is to be high.

(C2) Stationary flow characteristics can also be expressed as flow characteristics with high periodicity, an extremely large period, and an extremely small amplitude. Since the amplitude is extremely small, it is likely that a deviation in the phase does not have a considerable effect on the correlation coefficient. Therefore, in a case of at least two stationary flow characteristics, the more similar the frequency component, the more likely that the correlation coefficient is to be high.

(C3) In flow characteristics with low periodicity, a characteristic frequency component (period) or phase is likely to be absent. For example, data transmitted and received by an application system using an event such as an access by the user as a trigger is likely to have flow characteristics with low periodicity. However, for example, in a three-layer model of the WEB, data transmitted from a WEB server to an application server and data transmitted from the application server to a DB server are likely to be linked (transmitted at similar timings). In this manner, since behavior of pieces of data transmitted at similar timings using a same event as a trigger resembles that of a pulse wave, although there is no periodicity, the pieces of data are likely to have a high frequency component in approximately the same frequency band.

While the respective flows may be classed into (C1) to (C3) described above, the flows may also be classed according to slightly less stringent conditions. For example, the flows may be classed using only frequency components of flow characteristics. With this class method, compared to the class method described above, a possibility (of a false positive) in which a combination of flows with a low correlation exists in a same class rises and the load of a calculation process of a correlation coefficient increases but, conversely, a possibility (of a false negative) in which a combination of flows with a high correlation does not exist in a same class declines.

Next, an example of a calculation process of a frequency component will be described.

(D1) The flow group generation unit 111 extracts entries with the same flow ID 700 from the communication amount table 126.

(D2) The flow group generation unit 111 divides the time points 701 of the plurality of extracted entries at intervals of the flow discretization width 350 corresponding to the flow ID. In addition, the flow group generation unit 111 calculates a sum (or an average) of the communication amounts 702 of the respective divided entries. For example, when the flow discretization width 350 is "1 minute", the time points 701 of the plurality of extracted entries are divided at one-minute intervals. Subsequently, the flow group generation unit 111 calculates a sum (or an average) of the respective divided one-minute communication amounts. Accordingly, time series data of a communication amount (hereinafter, referred to as a "post-discretization flow communication amount") recalculated with the flow discretization width 350 is generated.

(D3) The flow group generation unit 111 performs frequency analysis with respect to the post-discretization flow communication amount calculated in (D2) described above and calculates a frequency component.

(D4) The flow group generation unit 111 stores the flow ID, a time point corresponding to the flow discretization width, and the post-discretization flow communication amount in the post-discretization communication amount table 127 (not shown).

(D5) The flow group generation unit 111 stores (overwrites) the flow discretization width and the frequency component calculated above in the flow discretization width 350 and the frequency component 360 corresponding to the flow ID 300 in the flow characteristics table 122. The flow group generation unit 111 performs the processes of (D1) to (D5) described above with respect to all flow IDs.

(Step 5025) The flow group generation unit 111 specifies a frequency band in which the frequency component 360 of each flow is large from the flow characteristics table 122. For example, the flow group extraction unit 111 may specify a frequency band to which N-number (where N is a positive integer) of higher-order frequency components belong. Alternatively, the flow group extraction unit 111 may specify a frequency band to which frequency components equal to or larger than a prescribed threshold belong.

Subsequently, the flow group extraction unit 111 classes the respective flows into the respective flow groups on the basis of the specified frequency band. For example, the flow group generation unit 111 may class the respective flows into two flow groups on the basis of whether the specified frequency band belongs to above a prescribed threshold or below the prescribed threshold. For example, the flow group generation unit 111 may class the respective flows into a plurality of flow groups on the basis of whether the specified frequency band belongs to any of a plurality of different sections. For example, with the specified frequency band as an attribute, the flow group extraction unit 111 may class the respective flows into a plurality of flow groups using a known clustering method such as the K-MEANS method.

In addition, the flow group generation unit 111 assigns a common flow group ID to the flow group IDs 340 corresponding to the flow IDs 300 classed into the same flow group in the flow group extraction unit 122.

(Step 5030) The flow group generation unit 111 calculates a flow group discretization width and a window size with respect to each flow group. In order to calculate a correlation coefficient with respect to a combination of flows, the discretization widths of the flows must match. In consideration thereof, in the present embodiment, a flow group discretization width is configured with respect to each flow group.

(E1) The flow group generation unit 111 extracts entries with the same flow group ID from the flow characteristics table 122.

(E2) The flow group generation unit 111 specifies a largest flow discretization width among the extracted entries.

(E3) The flow group generation unit 111 multiplies the specified largest flow discretization width (flow group discretization width) with a prescribed value to calculate the window size. The prescribed value may be a value equal to or more than one configured in advance.

(E4) The flow group generation unit 111 respectively stores (overwrites) the largest flow discretization width and the window size calculated in (E3) in the flow group discretization width 410 and the window size 420 corresponding to the flow group ID 300 in the flow group information table 123. Moreover, when the flow group ID of (E1) described above does not exist in the flow group information table 123, the flow group generation unit 111 may create a new entry.

(Step 5035) Using the communication amount table 126, with respect to each flow ID, the flow group generation unit 111 calculates a time point and a post-discretization flow communication amount corresponding to the flow group discretization width 410 of the flow group ID 340 to which the flow ID belongs and stores (overwrites) the time point and the post-discretization flow communication amount in the post-discretization communication amount table 127 (not shown) according to a procedure similar to that represented by (D1) to (D5) in step 5020.

According to the processes described above, flows with similar time series changes in data amounts thereof can be classed into the same flow group. In addition, a common flow group discretization width and a common window size can be calculated with respect to the flow group.

Figure 12:
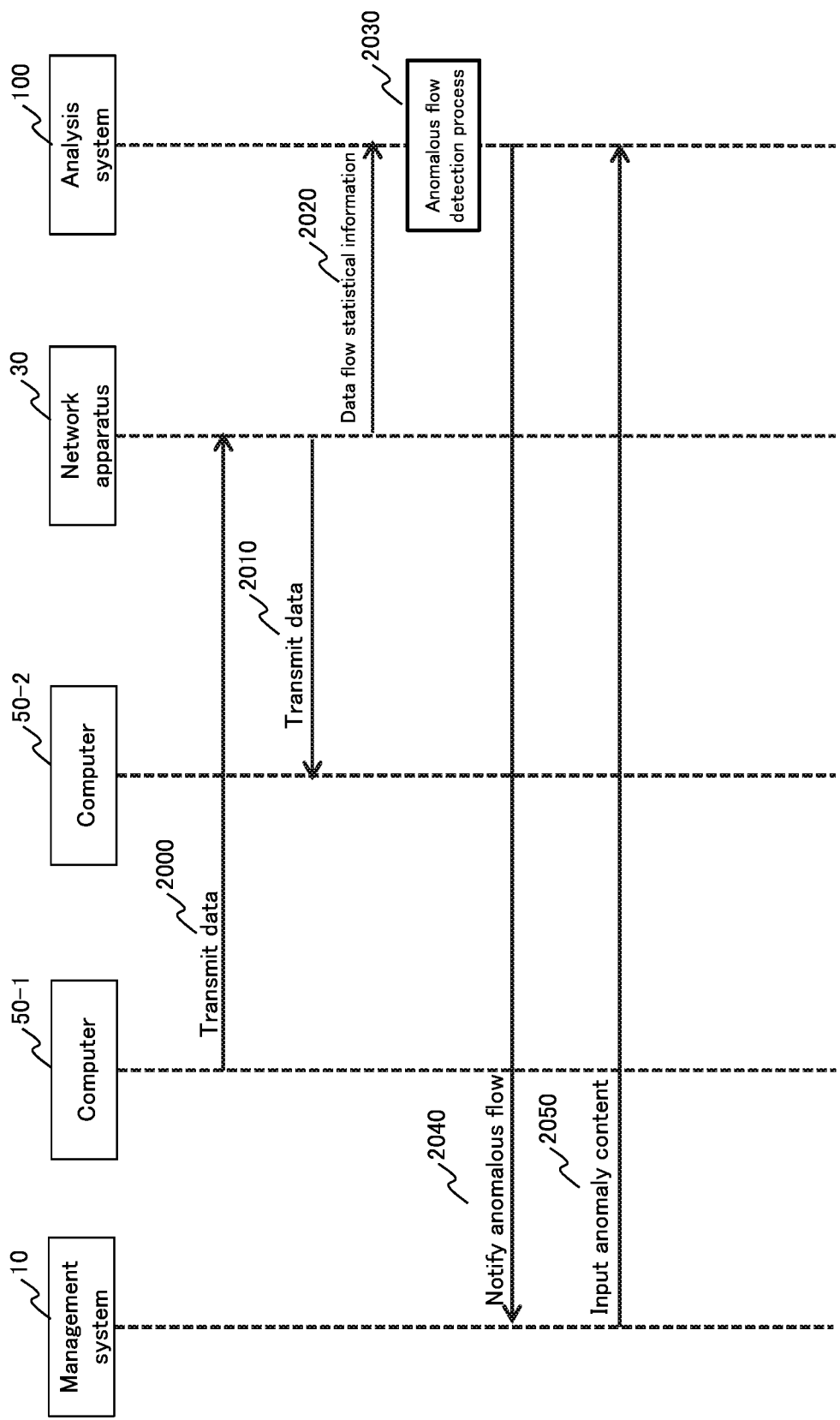
FIG. 12 is a sequence chart showing an example of a detection process of an anomalous flow.

FIG. 12 is a sequence chart showing an example of a detection process of an anomalous flow. The detection process of an anomalous flow may be executed at any time. FIG. 12 represents an example of a process in which the network apparatus 30 measures communication amounts of data transmitted by the computer 50-1 to the computer 50-2 and the analysis system 100 detects an anomalous flow on the basis of a result of the measurement.

The respective processes from step 2000 to step 2020 are the same as the respective processes from step 1000 to step 1020 shown in FIG. 10. Therefore, a description thereof will be omitted here.

(Step 2030) The analysis system 100 executes an anomalous flow detection process. Details of this process will be provided later (refer to FIG. 13).

(Step 2040) When detecting an anomalous flow, the analysis system 100 transmits information regarding the anomalous flow (data items of the flow information table 121, the correlation coefficient change time point 506 of the correlation information table 124, and the like) to the management system 10.

(Step 2050) The manager inputs, via the management system 10, contents of an anomaly having occurred in the customer system at the time of occurrence of the notified anomalous flow and the like. The management system 10 transmits the input anomaly content and the like to the analysis system 100. The analysis system 100 stores the transmitted anomaly content and the like in an entry corresponding to the anomalous flow ID in the anomaly information table 125. Accordingly, the anomalous flow is associated with contents of an anomaly having occurred in the customer system and the like.

Figure 13:
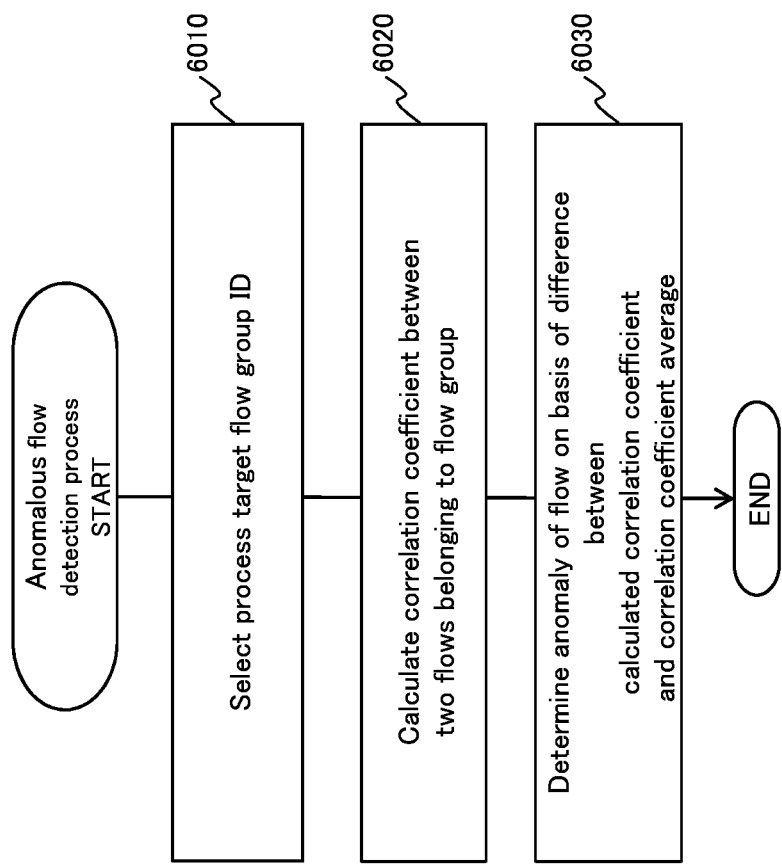
FIG. 13 is a flow chart showing an example of an anomalous flow detection process.

FIG. 13 is a flow chart showing an example of an anomalous flow detection process. The present process corresponds to the process of step 2030 in FIG. 12.

(Step 6010) The correlation calculation unit 112 selects a flow group ID that is a processing target.

(Step 6020) The correlation calculation unit 112 calculates a correlation coefficient between two flow IDs (the flow ID 500 and the paired flow ID 501) having the flow group ID selected in step 6010 and stores the calculated correlation coefficient in the correlation coefficient 502 of the correlation information table 124. For example, the correlation coefficient is calculated according to the processes of (F1) to (F4) described below.

(F1) The correlation calculation unit 112 extracts a record corresponding to the flow ID 500 and the paired flow ID 501 from the post-discretization communication amount table 127. For example, if "Xi" denotes a communication amount of the flow ID 500 "X" at a time point "i" and "Yi" denotes a communication amount of the paired flow ID "Y" at the time point "i", then a correlation coefficient "r" between the flow ID "X" and the paired flow ID "Y" is calculated by Expression (1) below.

[Math. 1]

$$r = \frac{\frac{1}{N}\sum_{i=1}^{N}(Xi-\overline{X})(Yi-\overline{Y})}{\sqrt{\frac{1}{N}\sum_{i=1}^{N}(Xi-\overline{X})^2}\sqrt{\frac{1}{N}\sum_{i=1}^{N}(Yi-\overline{Y})^2}} \quad (1)$$

In Expression (1), "N (where N is a positive integer)" denotes the number of entries of the flow ID "X" (or the flow ID "Y") in the post-discretization communication amount table 127. Since flows belonging to the same flow group are discretized with the same flow group discretization width, the flow IDs "X" and "Y" have the same "N" number of entries.

(F2) The correlation calculation unit 112 stores the calculated correlation coefficient "r" in the correlation coefficient 502 corresponding to the flow ID "X" and the paired flow ID "Y" in the correlation information table 124.

(F3) Using the currently calculated correlation coefficient "r", the correlation calculation unit 112 updates the previously calculated correlation coefficient average 504 and correlation coefficient standard deviation 505 in the correlation information table 124. In addition, the correlation calculation unit 112 increments the correlation coefficient calculation frequency 503.

(F4) The correlation calculation unit 112 executes the processes of (F1) to (F3) described above with respect to all combinations of flow IDs belonging to the flow group ID selected in step 6010.

The correlation calculation unit 112 executes the processes of (F1) to (F4) described above with respect to all flow group IDs. Accordingly, the calculation frequency of correlation coefficients equals the number of combinations of flows belonging to the same flow group (a product of the square of the number of flows belonging to a flow group and the number of flow groups). The calculation frequency is smaller than the number of all combinations flows (the square of the number of flows). Therefore, according to the present embodiment, calculation resources and/or a calculation time required to calculate a correlation coefficient can be reduced.

(Step 6030) The correlation calculation unit 112 calculates a difference between the correlation coefficient 502 and the correlation coefficient average 504 in the correlation information table 124 and specifies entries of which the difference is greater than a prescribed threshold. In addition, the correlation calculation unit 112 stores the flow ID 500 and the paired flow ID 501 of the specified entries in the flow ID 600 and the paired flow ID 601 of the anomaly information table 125. This is because, when a correlation coefficient greatly deviates from an average correlation coefficient (when there is a remarkable change in the correlation coefficient), it is likely that the flow and/or the paired flow related to the correlation coefficient are anomalous. Moreover, the prescribed threshold with respect to the difference may be defined as a threshold on the basis of a standard deviation of correlation coefficients.

The embodiment described above merely represents an example for illustrating the present invention, and it is to be understood that the scope of the present invention is not limited to the embodiment. It will be obvious to those skilled in the art that the present invention can be implemented in various other modes without departing from the spirit of the present invention.

REFERENCE SIGNS LIST

3 Data network
10 Management system
21 Control network
30 Network apparatus
50 Computer
100 Analysis system

The invention claimed is:

1. An anomaly detection apparatus for detecting data flow anomalies, the anomaly detection apparatus comprising a processor and a memory, wherein
the processor is configured to:
classify a plurality of data flows on the basis of a similarity in time series changes in data amounts of the data flows;
calculate a correlation coefficient at a normal time and a correlation coefficient at a certain timing between at least two data flows belonging to a same class; and
determine that at least one of the at least two data flows is anomalous when a difference between the correlation coefficient at the normal time and the correlation coefficient at the certain timing is greater than a prescribed threshold,
wherein the data flows belonging to a same class have a same discretization width.

2. The anomaly detection apparatus according to claim 1, wherein
the data flows refer to flows of data which flow from a source to a destination via a communication network.

3. The anomaly detection apparatus according to claim 2, wherein
a contrast time which is configured as a range of a calculation target of a correlation coefficient with respect to time series changes in data amounts of data flows is common among data flows belonging to a same class.

4. The anomaly detection apparatus according to claim 3, wherein the contrast time is calculated as a multiple of the discretization width which is configured with respect to time series changes in data amounts of the data flows belonging to a same class.

5. The anomaly detection apparatus according to claim 4, wherein
the commonly-configured discretization width is a longest discretization width among discretization widths calculated on the basis of time series changes in a data amount for each of the data flows belonging to a same class.

6. The anomaly detection apparatus according to claim 2, wherein
the processor is configured to cause data flows, which have similar characteristics of a frequency component of time series changes in a data amount, to belong to a same class.

7. The anomaly detection apparatus according to claim 6, wherein
similar characteristics of the frequency component corresponds to overlapping of at least a part of a frequency band including a frequency component equal to or greater than a prescribed threshold.

8. The anomaly detection apparatus according to claim 1, wherein
the processor is configured to notify, when determination has been made that a data flow is anomalous, a timing at which the anomaly had been detected and information on a source and a destination of the data flow, and accept input of contents of a failure having occurred at the timing.

9. An anomaly detection system for detecting data flow anomalies, the anomaly detection system comprising an analysis apparatus and a network apparatus, wherein
the analysis apparatus is configured to:
collect information on time series changes in data amounts of a plurality of data flows from the network apparatus;
classify the plurality of collected data flows on the basis of similarity in time series changes in data amounts of the data flows;
calculate a correlation coefficient at a normal time and a correlation coefficient at a certain timing between at least two data flows belonging to a same class; and
determine that at least one of the at least two data flows is anomalous when a difference between the correlation coefficient at the normal time and the correlation coefficient at the certain timing is greater than a prescribed threshold,
wherein the data flows belonging to a same class have a same discretization width.

10. An anomaly detection method using a computer apparatus for detecting data flow anomalies, the anomaly detection method comprising:
classing a plurality of data flows on the basis of similarity in time series changes in data amounts of the data flows;
calculating a correlation coefficient at a normal time and a correlation coefficient at a certain timing between at least two data flows belonging to a same class; and
determining that at least one of the at least two data flows is anomalous when a difference between the correlation coefficient at the normal time and the correlation coefficient at the certain timing is greater than a prescribed threshold,
wherein the data flows belonging to a same class have a same discretization width.

* * * * *